J. F. TRADER & S. R. COLLIER.
CORN PLANTING MACHINE.
No. 176,098. Patented April 11, 1876.
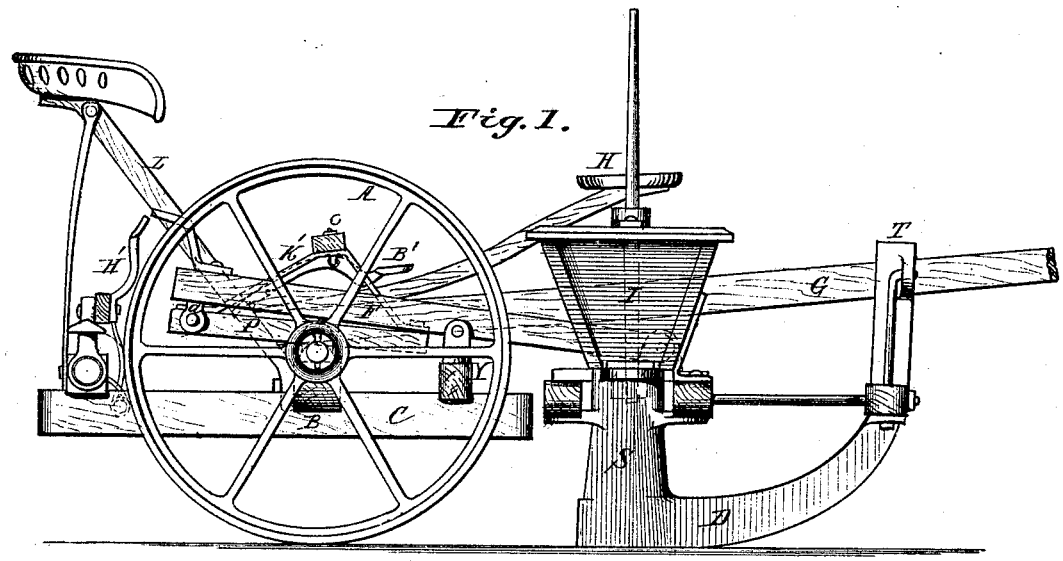
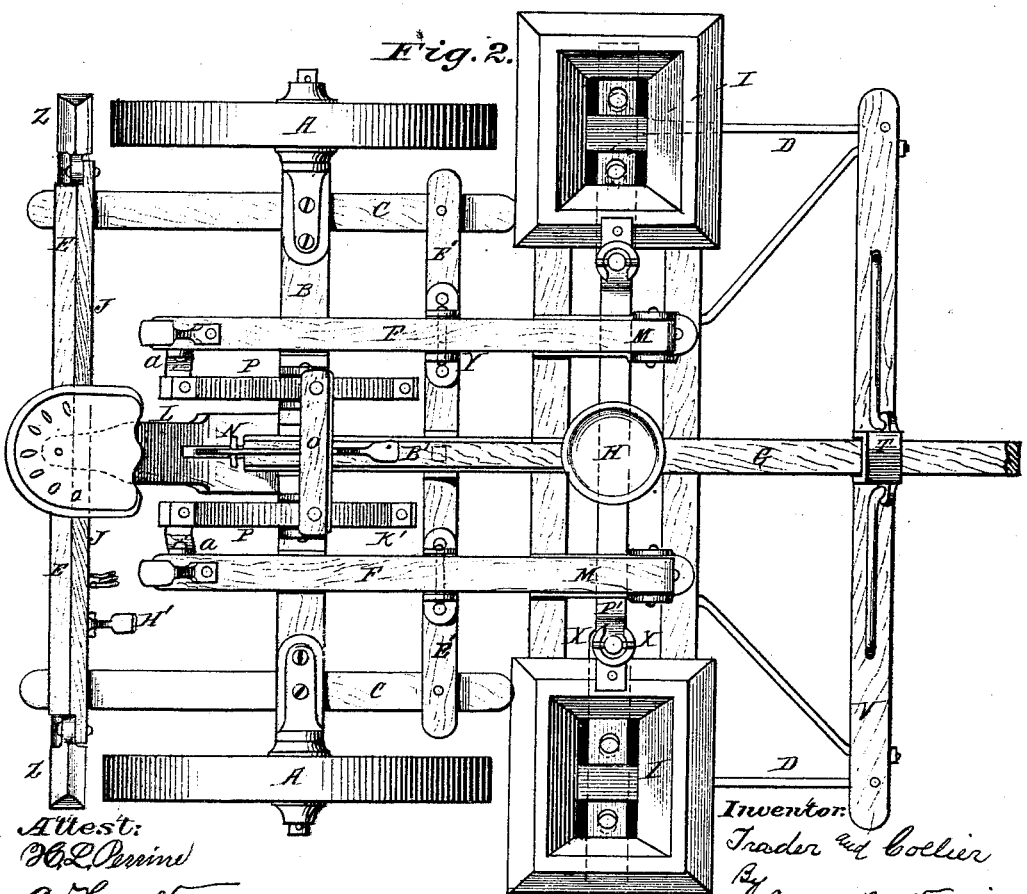

UNITED STATES PATENT OFFICE.

JAMES F. TRADER AND SAMUEL R. COLLIER, OF XENIA, OHIO.

IMPROVEMENT IN CORN-PLANTING MACHINES.

Specification forming part of Letters Patent No. 176,098, dated April 11, 1876; application filed September 6, 1875.

*To all whom it may concern:*

Be it known that we, JAMES F. TRADER and SAMUEL R. COLLIER, of Xenia, in the county of Greene and State of Ohio, have invented certain new and useful Improvements in Corn-Planting Machines, of which the following is a specification:

This invention relates to certain improvements in corn-planting machines; and consists of a novel combination and arrangement of parts, which will be fully hereinafter described, and specifically pointed out in the claims.

In the drawing, Figure 1 represents a plan view of our improvement. Fig. 2 is a top or plan view of our invention.

The main frame is composed of frame-pieces C C and E and E', preferably bolted together, as shown, and rigidly attached to axle B. G represents the tongue, which is rigidly attached to axle B and cross-bar E' by being bolted to brackets, or in any other convenient manner. The construction of the frame and tongue is such that, as the tongue is elevated or depressed, they rock upon the axle B. The runner-frame is composed, substantially, of the shoes D, seed-tubes S, cross-bars X, X, and V, which are connected together, and braced in any appropriate manner. T represents a clevis or slotted bracket. This slot or clevis is sufficiently wide to allow the tongue to pass through and move up and down therein. The slot is of sufficient depth to allow the runner-frame or the tongue to rise and fall the desired distance. F F represent levers, which are preferably pivoted to the runner-frame by means of iron brackets or ears M M. Y Y represent bracket-ears on cross-bars E' for pivoting levers F to the main frame. The offices of these levers are four: First, the draft is applied, through them, from the main frame to the runners; second, the rear end of these levers being elevated by the brackets Y are brought in proper position for the driver to rest his feet upon, and, by foot-pressure, elevate the frame vertically. The brackets M should be attached to the runner-frame at a point where the weight of the frame will be counterbalanced on the pivots, or so that it may be lifted instead of being tilted. Third, by elevating or lifting on the rear ends of the levers F pressure will be applied to the runner-frame to hold in position, or cut a deeper furrow. It is also obvious that this method of pivoting the levers F to the two frames allows the main frame to rock without affecting the runner-frame, or the runner-frame to rise without affecting the operation of the main frame. P P represent bars pivoted to the axle B, preferably by brackets or ears, as shown in Fig. 2. K K' represent arched brackets or standards, connected together at the top by cross-bar O, and pivoted at the front ends by rocking-levers P, and are connected to levers F, at the rear ends, by pivoted levers a, which together form a compound lever for depressing the runner-frame, by applying pressure to bar O.

Instead of the frame P P O K K', for applying pressure to the levers F, link or jointed levers may be used, attached to the seat, and connected with the main frame and levers F for elevating or depressing the runner-frame, substantially the same as used in horse-rakes or other implements.

B' represents a detachable attraction-latch, the front end of which forms a foot-board, and preferably pivoted to cross-bar O, extended rearward, and passing through a slat in standard L, with notches cut therein for engaging with an iron catch, N, placed across the slat in standard L. Two notches are employed. When the front notch engages with the catch N the runner-frame is locked to main frame, and holds the shoes out of the ground. When the rear notch is engaged with the catch N the runner-frame is depressed into the ground, and held in position for planting.

When it is desired to elevate or depress the runner-frame, or when the driver desires to control the operation of the shoes with his feet, the attraction-latch is thrown out of lock by pressure of the foot, and the two frames are free to move, or to be controlled independent of each other, at the option of the attendants.

P' represents a valve-rod for operating the valves at the bottom of the seed-boxes I. Double drop-valves of the ordinary kind are preferred. It is essential, however, to the operation of the levers and frames of one machine to have the connecting valve-rod P' placed below the levers F and tongue G, and for the hand-lever for operating the valve-rod to be placed to one side thereof, so that the attendant riding upon the seat H can have perfect control of the dropping arrangements, while the rear attendant or driver will control the machine, in all other respects, without interfering with the dropping.

Another feature of our invention is the scrapers Z, which are pivoted at the rear of the main frame, and connected together, by crank-lever J and hand or foot lever H', for bringing the scraper into contact with the driving-wheels A, for the purpose of scraping off the damp soil. A spring should be attached to the crank-rod J for throwing scraper Z out of contact with the wheels when the lever H' is released. This method of combining two independent frames has important advantages over those hitherto used. The rear machine and tongue being allowed to rock or move up and down independent of the runner-frame, the movement of the horses, or of the driving-wheels, on irregular ground, and in going up and down hill, does not affect the depth of the furrow. Again, the runner-frame can be elevated bodily over obstructions, or turned around in the field, to better advantage, than when the two frames are pivoted together direct, allowing the runner-frame to be lifted instead of tilted.

We claim—

1. In a corn-planter, the combination of the main frame, mounted on the driving-wheels, the runner-frame D S, connected together by means of levers F and M, pivoted centrally to the runner-frame, substantially as herein set forth.

2. In combination with the main frame and the runner-frame S D, provided with the strapped clevis T, the levers E M, pivoted centrally to the runner-frame, and the tongue G, substantially as and for the object set forth.

In testimony whereof we have hereunto set our hands this 1st day of September, 1875.

JAMES F. TRADER.
SAML. R. COLLIER.

Witnesses:
CHAS. W. TRADER,
ISAAC B. JONES.